(12) United States Patent
Eitelhuber et al.

(10) Patent No.: US 11,667,309 B2
(45) Date of Patent: Jun. 6, 2023

(54) SYSTEM FOR STABILIZING A TRACK-WHEEL BASED DEVICE ON A SUPPORT TRACK

(71) Applicants: Georg Robert Eitelhuber, Thuwal (SA); Abdul Rahim, Thuwal (SA); Steven Schneider, Las Vegas, NV (US)

(72) Inventors: Georg Robert Eitelhuber, Thuwal (SA); Abdul Rahim, Thuwal (SA); Steven Schneider, Las Vegas, NV (US)

(73) Assignee: NOMADD DESERT SOLAR SOLUTIONS PTE. LTD., Singapore (SG)

( * ) Notice: Subject to any disclaimer, the term of this patent is extended or adjusted under 35 U.S.C. 154(b) by 581 days.

(21) Appl. No.: 16/802,649

(22) Filed: Feb. 27, 2020

(65) Prior Publication Data

US 2021/0269067 A1 Sep. 2, 2021

(51) Int. Cl.
*B61F 9/00* (2006.01)

(52) U.S. Cl.
CPC .................................... *B61F 9/00* (2013.01)

(58) Field of Classification Search
CPC ........... B61F 9/00; B61B 13/00; B61B 13/04; B61K 5/02
See application file for complete search history.

(56) References Cited

FOREIGN PATENT DOCUMENTS

| CN | 109204359 A | * | 1/2019 | ................ B61F 3/00 |
| CN | 110143206 A | * | 8/2019 | ................ B61F 9/00 |

* cited by examiner

*Primary Examiner* — Robert J McGarry, Jr.

(57) ABSTRACT

This disclosure relates to system for stabilizing a track-wheel based device is disclosed. In some embodiments, the system may include a support track configured to support the track-wheel based device. The system may further include a support-finger coupled to the track-wheel based device via a pivot point, the support-finger being rotatable about the pivot point between a first position and a second position. In the first position, the support-finger may be configured to sandwich the support track between the track-wheel based device and the support-finger. The system may further include a biasing member having a first end and second end. The biasing member may be coupled to the at least one support-finger via the first end, and to the track-wheel based device via the second end. Further, the biasing member may be configured to maintain the at least one support-finger biased in the first position.

16 Claims, 4 Drawing Sheets

SYSTEM FOR STABILIZING A TRACK-WHEEL BASED DEVICE ON A SUPPORT TRACK

TECHNICAL FIELD

This disclosure relates generally to a track-wheel based device, and particularly to a method and a system for stabilizing a track-wheel based device on a support track.

BACKGROUND

There has lately been a steep rise in the adoption of the solar-based technology as an alternative to energy production technologies. This has led to installation of a large number of solar power plants, which use solar panels. As it will be appreciated by those skilled in the art, the solar panels require regular cleaning, for example to remove dust, for efficient working of the solar panels.

Some devices, for example, robotic devices, may be used for cleaning of the solar panels. For example, a robotic device may be configured to move across the solar panel in order to cover a maximum area of a solar panel. As such, the robotic device may be configured to move on one or more support tracks, like rails. As it will appreciated by those skilled in the art, the robotic device may be prone to falling from the support track, for example, due to an external force like wind. It may be understood that the likelihood of the falling of the robotic device is greater when the robotic device runs on a single support track.

In order to prevent the falling of the robotic device from the support track, the robotic device may include a bottom support. This bottom support may be positioned to encompass a bottom face of the support track over which the device may be running. However, an obstacle, for example, a vertical support for the support track, in the way of the bottom support may block the movement of the bottom support, and hence the movement of the robotic device, thereby interrupting the working of the robotic device.

SUMMARY

In an embodiment, a system for stabilizing a track-wheel based device is disclosed. The system may include a support track configured to support the track-wheel based device, to allow the track-wheel based device to perform a movement over the support track. The system may further include a support-finger coupled to the track-wheel based device via a pivot point. The support-finger may be rotatable about the pivot point between a first position and a second position. In the first position, the support-finger may be configured to sandwich the support track between the track-wheel based device and the support-finger. The system may further include a biasing member having a first end and second end. The biasing member may be coupled to the at least one support-finger via the first end, and the biasing member may be coupled to the track-wheel based device via the second end. Further, the biasing member may be configured to maintain the at least one support-finger biased in the first position.

In another embodiment, a track-wheel based device for moving on a support track is disclosed. The track-wheel based device may include a support-finger coupled to the track-wheel based device via a pivot point. The support-finger may be rotatable about the pivot point between a first position and a second position. In the first position, the support-finger may be configured to sandwich the support track between the track-wheel based device and the support-finger. The track-wheel based device may further include a biasing member having a first end and second end. The biasing member may be coupled to the at least one support-finger via the first end, and the biasing member may be coupled to the track-wheel based device via the second end. Further, the biasing member may be configured to maintain the at least one support-finger in the first position.

In yet another embodiment, a stabilizing assembly for stabilizing a track-wheel based device over a support track is disclosed. The stabilizing assembly may include a support-finger configured to be coupled to the track-wheel based device via a pivot point. The support-finger may be rotatable about the pivot point between a first position and a second position. In the first position, the support-finger may be configured to sandwich the support track between the track-wheel based device and the support-finger. The stabilizing assembly may further a biasing member having a first end and second end. The biasing member may be configured to be coupled to the at least one support-finger via the first end, and the biasing member may be coupled to the track-wheel based device via the second end. The biasing member may be configured to maintain the at least one support-finger biased in the first position.

The accompanying drawings, which are incorporated in and constitute a part of this disclosure, illustrate exemplary embodiments and, together with the description, serve to explain the disclosed principles.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A system for stabilizing a track-wheel based device on a support track is disclosed. This track-wheel based device may be configured to move along the support track, in order to perform one or more operations. These one or more operations may include cleaning of solar panels. The track-wheel based device may be equipped with a stabilizing assembly, which may prevent the track-wheel based device from losing balance and eventually falling from the support track, especially when the track-wheel based device is moving on a single support track. By way of an example, the track-wheel based device may become prone to losing balance and falling under the influence of an external force. Th external force may include wind, an unintended manual push, an inclination of the support track, etc.

The stabilizing assembly may include a stabilizing wheel and a support-finger. This stabilizing wheel of the stabilizing assembly may provide support to the track-wheel based device from one of the sides. The support finger may be rotatable about a pivot point, between a first position and a second position. In the first position, the support-finger may provide support to the track-wheel based device from the bottom, to avoid the falling of the track-wheel based device from the support track. For example, the support-finger may encompass a bottom face of the support track, such that the whenever the track-wheel based device tilts upon losing balance, the support finger may interrupt further tilting, and therefore prevent falling of the track-wheel based device from the support track.

It may be further noted that in case the track-wheel based device comes across an obstacle, for example, a vertical support for the support track, the support-finger may rotate to assume the second position. By way of rotating to the second position, the support-finger may make way for the obstacle to pass through, without blocking the movement of the track-wheel based device.

Figure 1:
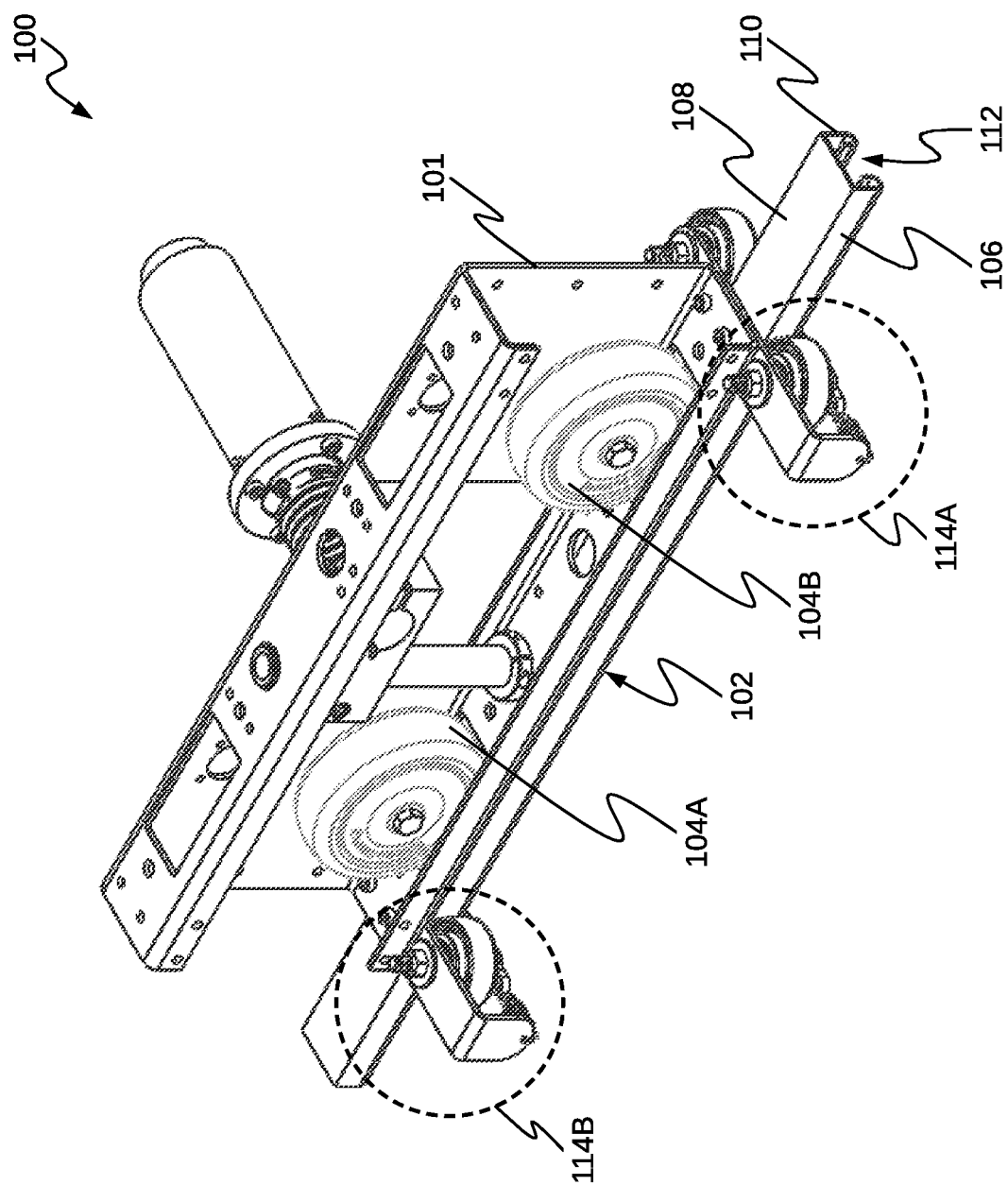
FIG. 1 illustrates a perspective view of a system for stabilizing a track-wheel based device, in accordance with some embodiments, of the present disclosure.

Referring now to FIG. 1A, a perspective view of a system 100 for stabilizing a track-wheel based device on a support track is illustrated, in accordance with some embodiments, of the present disclosure. In some embodiments, the system 100 may include a support track 102. It may be noted that the support track 102 may be any surface capable of supporting a track-wheel based device 101. For example, the support track 102 may be an edge of a panel, a beam, a rail, etc. The track-wheel based device 101 may include at least one track-wheel 104A, 104B . . . (also, referred to as simply track-wheel 104) which may be configured to move (roll) on the support track 102. In other words, the track-wheel 104 may support the track-wheel based device 101 to move on the support track 102. For example, the track-wheel based device 101 may include a robotic device which may be configured to perform one or more operations on a solar panel. For example, the one or more operations may include cleaning of the solar panel. Alternately, the track-wheel based device 101 may further include a trolley for transporting goods from one position to another position along the support track.

In some embodiments, the support track 102 may include a first substantially vertical face 106, a first substantially horizontal face 108, a second substantially vertical face 110, and a second substantially horizontal face 112.

In some embodiments, the system 100 may further include at least one stabilizing assembly 114A, 114B . . . (also, referred to as simply stabilizing assembly 114). The stabilizing assembly 114 may prevent the track-wheel based device 101 from losing balance over the support track 102, and eventually falling from the support track 102.

The stabilizing assembly 114 may be coupled to the track-wheel based device 101. In some embodiments, the stabilizing assembly 114 may be integrated with the track-wheel based device 101. However, in alternate embodiments, the stabilizing assembly 114 may be retrofitted to the track-wheel based device 101. In other words, in such embodiments, the stabilizing assembly 114 may be fitted to an already manufactured track-wheel based device 101.

In some embodiments, one or more stabilizing assemblies 114 may be coupled to the track-wheel based device 101, based on requirement. For example, length of the track-wheel based device 101 may determine a number of the stabilizing assemblies 114 which may be required in order to ensure that the track-wheel based device 101 does not lose balance and fall from the support track.

In some embodiments, the one or more stabilizing assemblies 114 may be coupled to the track-wheel based device 101 on one side of the track-wheel based device 101. However, in alternate embodiments, the one or more stabilizing assemblies 114 may be coupled to the track-wheel based device 101 on each of two opposite sides of the track-wheel based device 101. The stabilizing assembly 114 is further explained in detail, in conjunction with FIG. 2-FIG. 5.

Figure 3:
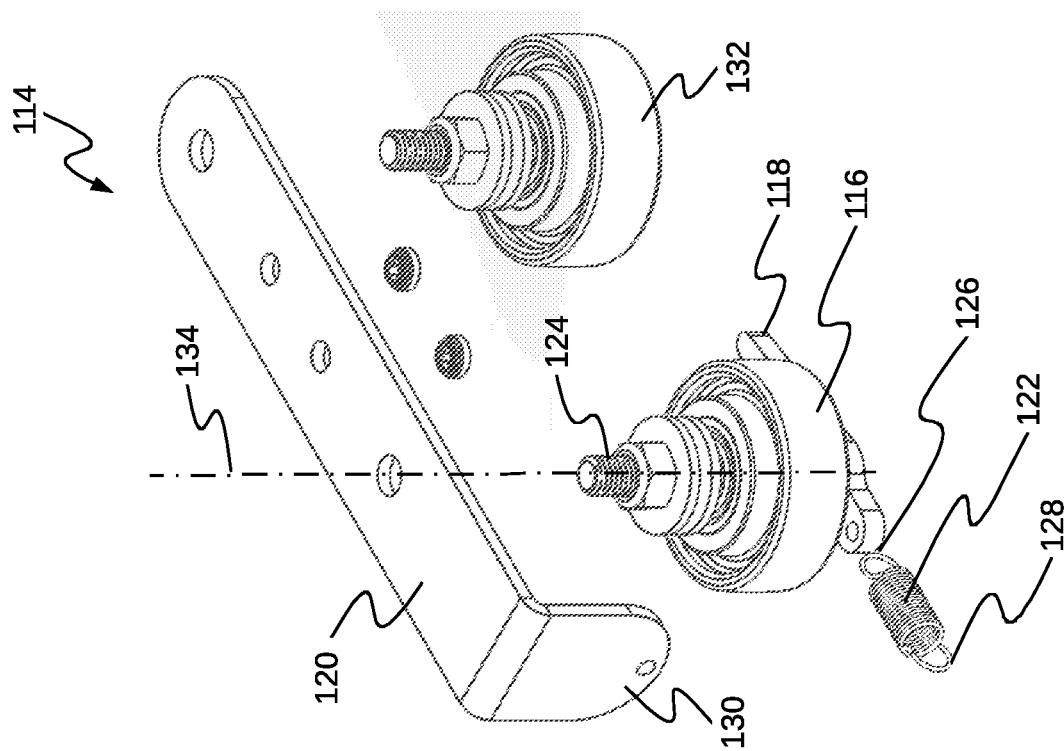
FIG. 3 illustrates a perspective view of an un-assembled stabilizing assembly, in accordance with some embodiments of the present disclosure.
Figure 2:
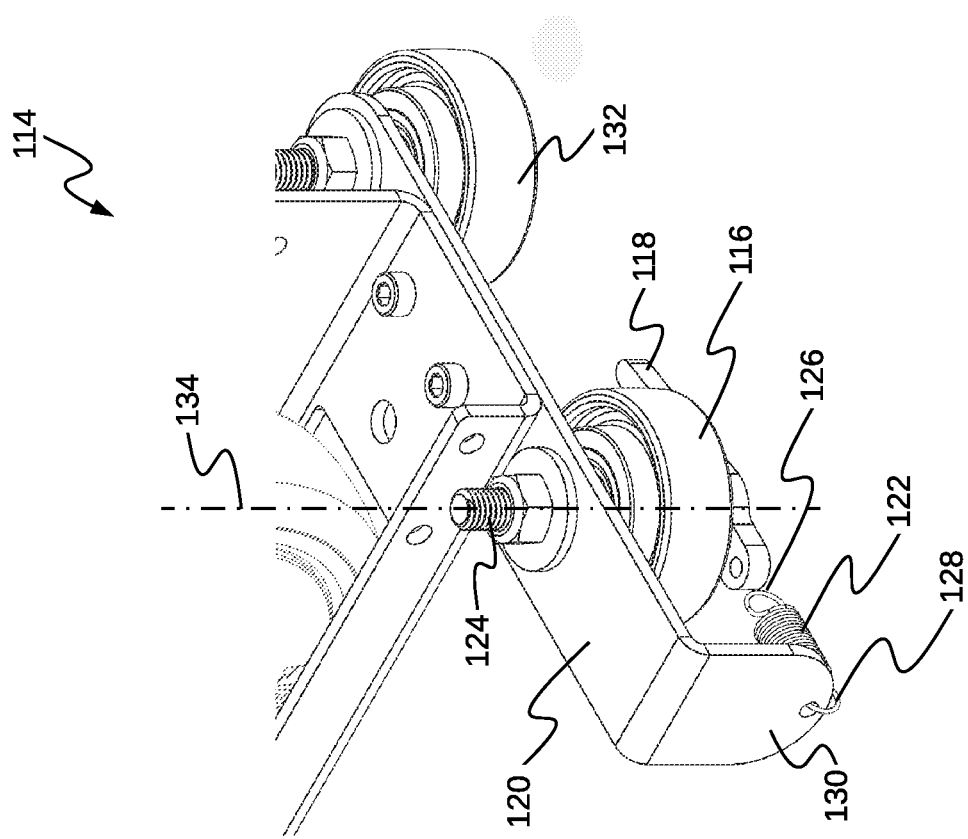
FIG. 2 illustrates a perspective view of an assembled stabilizing assembly, in accordance with some embodiments of the present disclosure.

Referring now to FIG. 2 and FIG. 3, a perspective view of an assembled stabilizing assembly 114 and a perspective view of un-assembled stabilizing assembly 114, respectively, is illustrated, in accordance with some embodiments of the present disclosure. In some embodiments, the stabilizing assembly 114 may include a stabilizing wheel 116 rotatable about an axis 134. The stabilizing wheel 116 may be coupled to the track-wheel based device 101. The stabilizing assembly 114 may further include a support-finger 118. In some embodiments, the support-finger 118 may be coupled to the track-wheel based device 101 via a pivot point. For example, in such embodiments, the support-finger 118 may be coupled to the stabilizing wheel 116 (coupled to the track-wheel based device 101) via the pivot point. The support-finger 118 may be coupled to the stabilizing wheel 116 using a bolt 124 passing through this pivot point. It may be further noted that in some embodiments, the stabilizing wheel 116 may be coupled to the track-wheel based device 101 using the same bolt 124.

The support-finger 118 may be rotatable about the pivot point between a first position and a second position. In other words, in such embodiments, an axis of rotation of the support-finger 118 may be same as the axis of rotation of the stabilizing wheel 116, i.e. axis 134. It may be noted that in the first position, the support-finger 118 may sandwich the support track 102 between the track-wheel based device 101 and the support-finger 118.

The stabilizing assembly 114 may further include a support bracket 120. For example, the support bracket 120 may be fitted to the track-wheel based device 101. The support bracket 120 may include a kickdown portion 130 at one end of the support bracket 120. The stabilizing assembly 114 may further include a biasing member 122. By way of an example, the biasing member 122 may include a coil spring, a spiral spring, or a leaf spring.

The biasing member 122 may include a first end 126 and a second end 128. The biasing member 122 may be coupled to the support-finger 118 via the first end 126. Further, the biasing member 122 may be coupled to the track-wheel based device 101 via the second end 128. In some embodiments, as shown in FIG. 2, the biasing member 122 may be coupled to the track-wheel based device 101 via the support bracket 120, via the second end 128. In particular, in such embodiments, the biasing member 122 may be coupled to the kickdown portion 130 of the support bracket 120. It may be noted that the biasing member 122 may be biased so as to maintain the support-finger 118 in the first position. For example, in first position of the support-finger 118, the biasing member 122 may be un-stretched.

In some embodiments, the stabilizing assembly 114 may further include a secondary wheel 132, such that during operation, the secondary wheel 132 may run along the second substantially vertical face 110 (not shown in FIG. 4) of the support track 102 (not shown in FIG. 4), as the track-wheel based device 101 (not shown in FIG. 4) may run on the support track 102. It may be noted that the secondary wheel 132 may be of similar construction to the stabilizing wheel 116. In some embodiments, the secondary wheel 132 may be positioned opposite to the stabilizing wheel 116.

Figure 4:
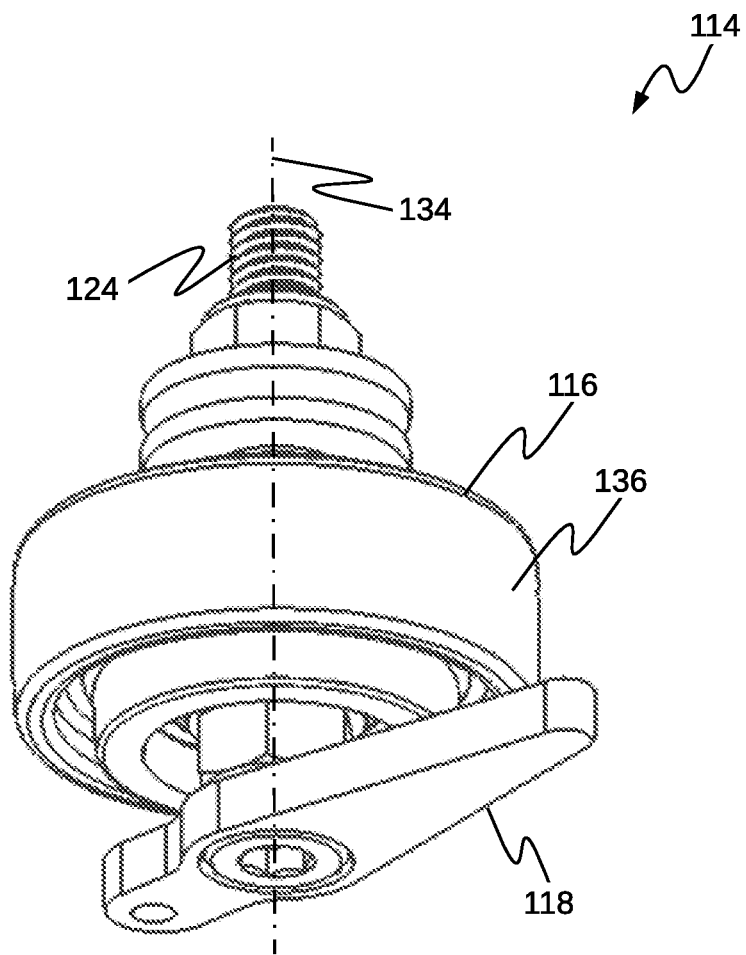
FIG. 4 illustrates a perspective view of a stabilizing wheel and a support-finger of a stabilizing assembly, in accordance with some embodiments of the present disclosure.

Referring now to FIG. 4, a perspective view of the stabilizing wheel 116 the support-finger 118 of the stabilizing assembly 114 are illustrated, in accordance with some embodiments of the present disclosure. It may be noted that during operation, the stabilizing wheel 116 may run along the first substantially vertical face 106 (not shown in FIG. 4) of the support track 102 (not shown in FIG. 4), as the track-wheel based device 101 (not shown in FIG. 4) may run on the support track 102. For example, stabilizing wheel 116 may include an outer surface 136. The stabilizing wheel 116 may run along the first substantially vertical face 106 via the outer surface 136. In other words, the outer surface 136 of the stabilizing wheel 116 may be in contact with the first substantially vertical face 106 of the support track 102, as the track-wheel based device 101 may run on the support track 102.

Further, as mentioned earlier and as shown in FIG. 4, the support-finger 118 may be coupled to the track-wheel based device 101 via the pivot point through which the bolt 124 may pass. In some embodiments, the support-finger 118 may be coupled to the stabilizing wheel 116 (of the track-wheel based device 101) via this pivot point. The support-finger 118 is further explained in detail, in conjunction with FIG. 5.

Figure 5:
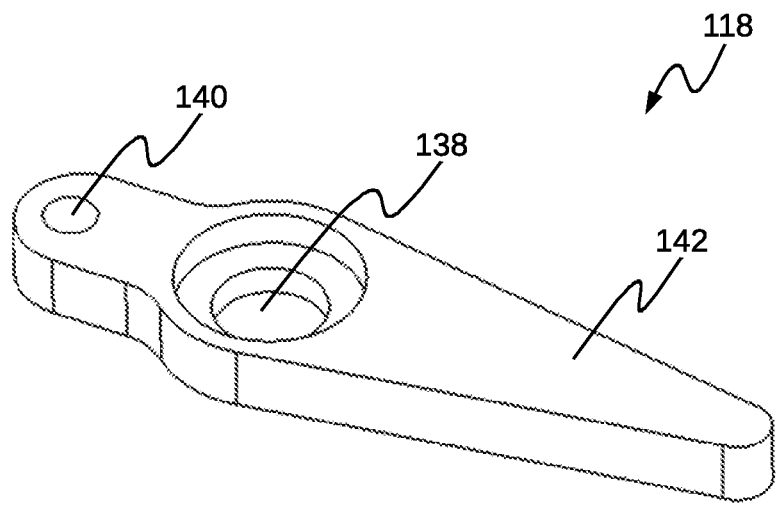
FIG. 5 illustrates a perspective view of a support-finger, in accordance with some embodiments of the present disclosure.

Referring now to FIG. 5, a perspective view of the support-finger 118 is illustrated, in accordance with some embodiments of the present disclosure. As mentioned earlier, the support-finger 118 may be coupled to the stabilizing wheel 116 at the pivot point. It may be noted that the pivot point may include a first hole 138. The support-finger 118 may be coupled to the stabilizing wheel 116 using the bolt 124 which passes through this first hole 138. It may be further noted that, in some embodiments, the stabilizing wheel 116 may be coupled to the track-wheel based device 101 using the same bolt 124.

Further, as shown in FIG. 5, the support-finger 118 may include a flank 142. It may be noted that in the first position, the flank 142 of the support-finger 118 may sandwich the support track 102 between the track-wheel based device 101 and the support-finger 118. By sandwiching the support track 102 between the track-wheel based device 101 and the support-finger 118, the support-finger 118 may further provide a support to the track-wheel based device 101 from the bottom, to avoid the falling of the track-wheel based device 101 from the support track 102.

As mentioned earlier, the stabilizing assembly 114 may include the biasing member 122 (not shown in FIG. 5) having the first end 126 and the second end 128, and that the biasing member 122 may be coupled to the support-finger 118 via the first end 126. It may be noted that the biasing member 122 may be coupled to the support-finger 118 via the second hole 140 of the support-finger 118.

Figure 6:
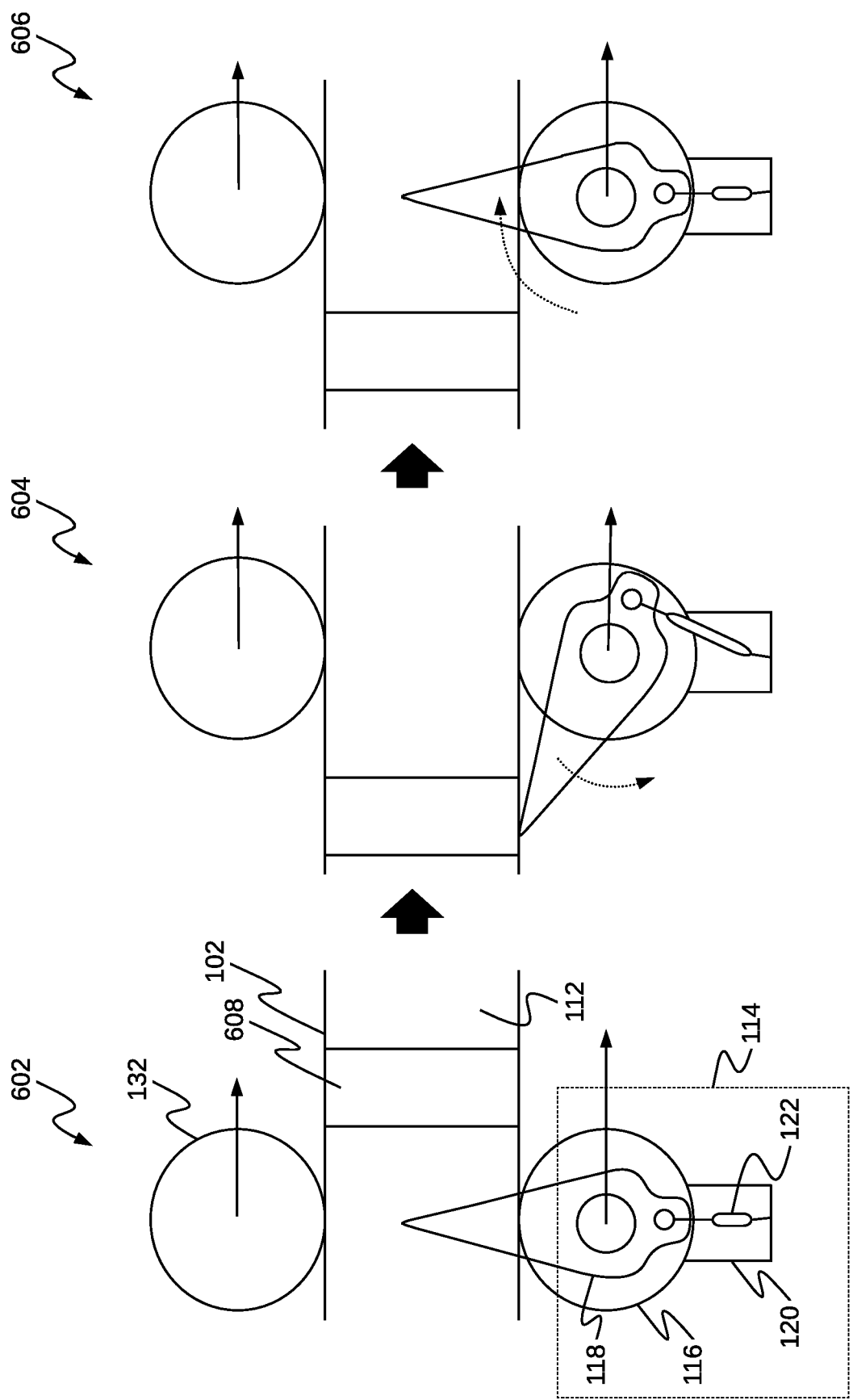
FIG. 6 illustrates a process of stabilizing a track-wheel based device, in accordance with some embodiment of the present disclosure.

Referring now to FIG. 6, a process 600 of the stabilizing the track-wheel based device 101 (now shown FIG. 6) on the support track 102 is illustrated, in accordance with some embodiments of the present disclosure. By way of an example, the track-wheel based device 101 may include the stabilizing assembly 114. The stabilizing assembly 114 may further include the stabilizing wheel 116 coupled to the track-wheel based device 101. The stabilizing assembly 114 may further include the support-finger 118 coupled to the track-wheel based device 101 via a pivot point. Further, the support-finger 118 may be rotatable about the pivot point between a first position and a second position, and in the first position, the support-finger 118 may sandwich the support track 102 between the track-wheel based device 101 and the support-finger 118. The stabilizing assembly 114 may further include the support bracket 120 fitted to the track-wheel based device and a biasing member 122. The biasing member 122 may be coupled to the track-wheel based device 101 via the support bracket 120. The biasing member 122 may be biased so as to maintain the support-finger 118 in the first position in which the biasing member 122 may be un-stretched. The stabilizing assembly 114 may further include the secondary wheel 132.

It may be noted that the track-wheel based device 101 may be prone to falling from the support track 102, for example, due to external forces, like wind, especially, when the track-wheel based device 101 runs on a single support track 102. As such, the track-wheel based device 101 may be equipped with the stabilizing assembly 114 which may avoid the falling of the track-wheel based device 101 from the support track 102. For example, the stabilizing wheel 116 and the secondary wheel 132 of the stabilizing assembly 114 may provide support to the track-wheel based device 101 from the sides. The support-finger 118 may further provide a support to the track-wheel based device 101 from the bottom, to avoid the falling of the track-wheel based device 101 from the support track 102. Further, the stabilizing assembly 114 may prevent the falling of the track-wheel based device 101 from the support track 102, when the support track may include an obstacle, for example, a vertical support for the support track 102.

As shown in FIG. 6, in a first scenario 602, the support-finger 118 has not encountered an obstacle 608. As such, the support-finger 118 may be in the first position. In the first position, the support-finger 118 may encompass the second substantially horizontal surface 112 of the support track 102 over which the track-wheel based device 101 may be running. As shown in FIG. 6, it may be noted that the support-finger 118 may be rotatable in a plane parallel to the second substantially horizontal face 112. It may be further noted that the support-finger 118 may be rotatable about an axis (for example, axis 134) which may be substantially perpendicular to the plane of rotation (i.e. the second substantially horizontal face 112) of the support-finger 118. For example, the track-wheel based device 101 may be running in the right direction. Further, in the first position of support-finger 118, the biasing member 122 may maintain the support-finger 118 biased in the first position. For example, the biasing member 122 may be un-stretched in the first position of support-finger 118. It may be noted that the support-finger 118 may stay in the first position until the support-finger 118 has encountered an obstacle, for example, the obstacle 608.

In a second scenario 604, the support-finger 118 encounters the obstacle 608. As a result, the support-finger 118 may shift into a second position. It may be understood that by way of the support-finger 118 shifting into the second position, the track-wheel based device 101 may be able to move past the obstacle 608. As it can be seen in the FIG. 6, in the second position, the support-finger 118 may have rotated in anti-clockwise direction, to make way for the obstacle 308.

It may be understood that as a result of the support-finger 118 shifting into the second position, a distance between the second hole 140 and the kickdown portion 130 of the support bracket may increase, thereby stretching the biasing member 122. It may be further understood that, in the second position of the support-finger 118, the biasing member 122 (due to stretching), may be forcing to restore the support-finger 118 into the first position. In other words, the biasing member 122 may be forcing the support-finger 118 to rotate in clock-wise direction to return to the first position.

In a third scenario 606, the support-finger 118 (and the track-wheel based device 101) may have moved past the obstacle 608. As a result, the support-finger 118 may return to the first position. It may be noted that as soon as the support-finger 118 loses contact with the obstacle 608 as a result of the track-wheel based device 101 moving past the obstacle 608 (i.e. moving in the right direction), the support-finger 118 may rotate in clock-wise direction so as to return into the first position. It may be further noted that the rotation of the support-finger 118 in the clock-wise direction may be caused by the biasing member 122. Further, once the support-finger 118 returns into the first position, the biasing member 122 may once again become un-stretched.

One or more techniques are disclosed above for stabilizing a track-wheel based device on a support track. The techniques provide a stabilizing assembly which may include a stabilizing wheel and a support-finger. This stabilizing wheel of the stabilizing assembly may provide support to the track-wheel based device from the side. The support finger may be rotatable about a pivot point, between a first position and a second position. In the first position, the support-finger may provide support to the track-wheel based device from the bottom, to avoid the falling of the track-wheel based device from the support track.

The above techniques provide for a simple mechanism for avoiding falling of the track-wheel based device from the support track, while using a minimum number of moving parts. By way of the above, the manufacturing cost of the mechanism is reduced. Further, the mechanism can retrofitted to existing devices, which reduces installation and running costs. Further, the above techniques minimize wear and tear and usage of lubricants. As such, the regular maintenance cost is reduced.

It is intended that the disclosure and examples be considered as exemplary only, with a true scope and spirit of disclosed embodiments being indicated by the following claims.

What is claimed is:

1. A system for stabilizing a track-wheel based device, the system comprising:
    a support track configured to support the track-wheel based device, to allow the track-wheel based device to perform a movement over the support track, wherein the support track comprises a first substantially vertical face, a second substantially vertical face, a first substantially horizontal face, and a second substantially horizontal face;
    a support-finger coupled to the track-wheel based device via a pivot point, the support-finger being rotatable about the pivot point between a first position and a second position, wherein in the first position, the support-finger is configured to sandwich the support track between the track-wheel based device and the support-finger, wherein the at least one support-finger is rotatable in a plane parallel to the second substantially horizontal face; and
    a biasing member having a first end and second end, the biasing member being coupled to the at least one support-finger via the first end, the biasing member being coupled to the track-wheel based device via the second end, wherein the biasing member is configured to maintain the at least one support-finger biased in the first position.

2. The system of claim 1, wherein the biasing member comprises at least one of a coil spring, a spiral spring, and a leaf spring.

3. The system of claim 1, wherein the track-wheel based device comprises:
    at least one track-wheel configured to run over the first substantially horizontal face, and
    at least one stabilizing wheel configured to run along the first substantially vertical face.

4. The system of claim 3, wherein the support-finger is coupled to the track-wheel based device via the at least one stabilizing wheel, wherein an axis of rotation of the support-finger is along an axis of the at least one stabilizing wheel.

5. The system of claim 1, further comprising a support bracket coupled to the track-wheel based device, wherein the biasing member is coupled to the support bracket via the second end.

6. A track-wheel based device for moving on a support track, the track-wheel based device comprising:
    a support-finger coupled to the track-wheel based device via a pivot point, the support-finger being rotatable about the pivot point between a first position and a second position, wherein in the first position, the support-finger is configured to sandwich the support track between the track-wheel based device and the support-finger, wherein the support track comprises a first substantially vertical face, a second substantially vertical face, a first substantially horizontal face, and a second substantially horizontal face, and wherein the at least one support-finger is rotatable in a plane parallel to the second substantially horizontal face; and
    a biasing member having a first end and second end, the biasing member being coupled to the at least one support-finger via the first end, the biasing member being coupled to the track-wheel based device via the second end, wherein the biasing member is configured to maintain the at least one support-finger in the first position.

7. The track-wheel based device of claim 6, wherein the biasing member comprises at least one of a coil spring, a spiral spring, and a leaf spring.

8. The track-wheel based device of claim 6, further comprising:
    at least one track-wheel configured to run over the first substantially horizontal face, and
    at least one stabilizing wheel configured to run along the first substantially vertical face.

9. The track-wheel based device of claim 8, wherein the support-finger is coupled to the track-wheel based device via the at least one stabilizing wheel, wherein an axis of rotation of the support-finger is along an axis of the at least one stabilizing wheel.

10. The track-wheel based device of claim 6 further comprising a support bracket, wherein the biasing member is coupled to the support bracket via the second end.

11. A stabilizing assembly for stabilizing a track-wheel based device over a support track, the stabilizing assembly comprising:

a support-finger configured to be coupled to the track-wheel based device via a pivot point, the support-finger being rotatable about the pivot point between a first position and a second position, wherein in the first position, the support-finger is configured to sandwich the support track between the track-wheel based device and the support-finger, wherein the support track comprises a first substantially vertical face, a second substantially vertical face, a first substantially horizontal face, and a second substantially horizontal face, and wherein the at least one support-finger is rotatable in a plane parallel to the second substantially horizontal face; and a biasing member having a first end and second end, the biasing member being configured to be coupled to the at least one support-finger via the first end, the biasing member being coupled to the track-wheel based device via the second end, wherein the biasing member is configured to maintain the at least one support-finger biased in the first position.

12. The stabilizing assembly of claim 11, wherein the stabilizing assembly is configured to be retrofitted to the track-wheel based device.

13. The stabilizing assembly of claim 11, wherein the biasing member comprises at least one of a coil spring, a spiral spring, and a leaf spring.

14. The stabilizing assembly of claim 11, wherein the track-wheel based device comprises:

at least one track-wheel configured to run over the first substantially horizontal face, and at least one stabilizing wheel configured to run along the first substantially vertical face.

15. The stabilizing assembly of claim 14, wherein the support-finger is coupled to the track-wheel based device via the at least one stabilizing wheel, wherein an axis of rotation of the support-finger is along an axis of the at least one stabilizing wheel.

16. The stabilizing assembly of claim 11, further comprising a support bracket configured to be coupled to the track-wheel based device, wherein the biasing member is coupled to the support bracket via the second end.

* * * * *